July 31, 1923. Re. 15,665
J. G. LEHMAN
TEMPERATURE CONTROL OF KETTLES BY ZONES
Original Filed Sept. 27, 1919
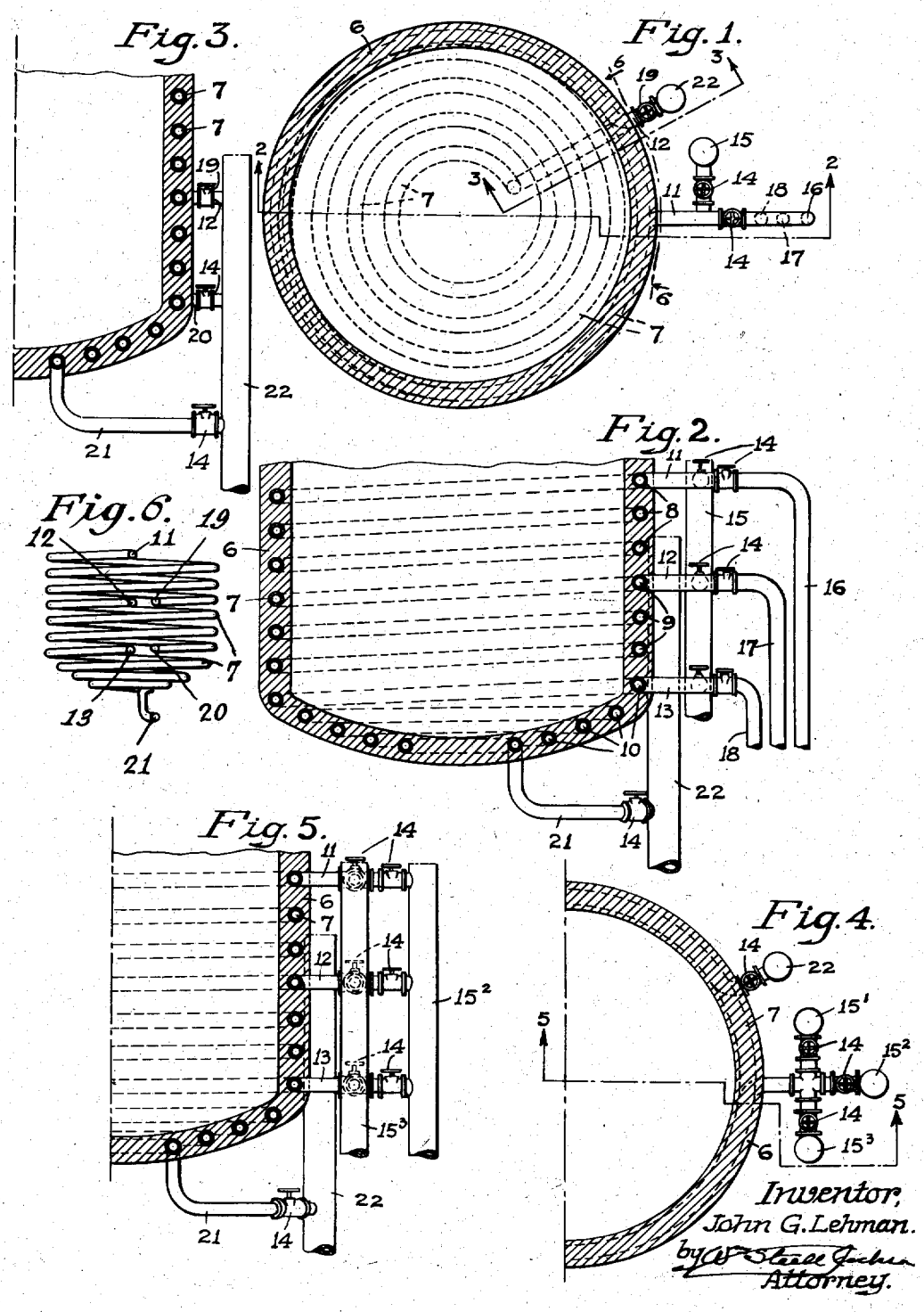

Reissued July 31, 1923. Re. 15,665

UNITED STATES PATENT OFFICE.

JOHN GEORGE LEHMAN, OF BETHLEHEM, PENNSYLVANIA, ASSIGNOR TO BETHLEHEM FOUNDRY & MACHINE COMPANY, OF BETHLEHEM, PENNSYLVANIA, A CORPORATION OF PENNSYLVANIA.

TEMPERATURE CONTROL OF KETTLES BY ZONES. REISSUED

Original No. 1,407,666, dated February 21, 1922, Serial No. 327,007, filed September 27, 1919. Application for reissue filed October 12, 1922. Serial No. 594,170.

*To all whom it may concern:*

Be it known that I, JOHN GEORGE LEHMAN, a citizen of the United States, and a resident of Bethlehem, in the county of Northampton and State of Pennsylvania, have invented certain new and useful Improvements in Temperature Control of Kettles by Zones, of which the following is a specification.

My invention relates to the heating or cooling of the walls of kettles and other receptacles, intended for the heat-treatment of liquids, particularly in carrying out chemical processes.

The purpose of my invention is to provide for different applications of heating or cooling fluid throughout different layers, belts or zones of a kettle.

A further purpose is to provide for heating one part of a liquid under treatment, at the same time that the heat is withdrawn from another part, or that the other part thereof is cooled, so as to give differential temperatures to the several parts thereof.

Further purposes will appear in the specification and in the claims.

I have preferred to illustrate my invention by but one general form, selecting a form which is practical, efficient and inexpensive and which at the same time well illustrates the principles of my invention.

Figure 1 is a horizontal section showing one arrangement of connections for the practice of my invention.

Figure 2 is a vertical broken section taken upon line 2—2 of Figure 1.

Figure 3 is a broken vertical section upon line 3—3 of Figure 1.

Figure 4 is a horizontal section showing a second arrangement of connections.

Figure 5 is a broken vertical section upon line 5—5 in Figure 4.

Figure 6 is a section upon line 6—6 of Figure 1, looking in the direction of the arrows but showing the pipe alone without the kettle walls.

In the drawings, similar numerals indicate like parts.

In many different lines of manufacture where heat-treatment of liquids is required, it is desirable to have the heat of the liquid under complete control, and my invention is directed to rapid, simple and effective control, differentiating between different layers or levels of the liquid being treated.

The container 6, generically called a kettle, is provided with a plurality of passages, or preferably a continous passage within its walls, shown as pipes 7, in order that a fluid may be passed through them for the purpose of heating or cooling the walls of the kettle, and thus correspondingly heating or cooling the contents.

These several passages 7 have been arranged in groups or in belts of which I show three, at 8, 9 and 10, with separate inlets and outlets, if separate sections be used, as in Figures 1–3, or tapped at intervals to provide inlets and outlets, where the passage is continuous, as in Figures 4 and 5.

In the form shown in Figures 1–3, these belts have separate inlets 11, 12 and 13, each from either of two different sources of supply and each source valved at 14 to control the supply. The one general source of supply 15 is available for any of the three inlets. The other sources, 16, 17 and 18 are separate, thus providing for different temperatures of heated or superheated steam, cold water, etc. In this form there are separate outlets also, at 19, 20 and 21, valved at 14 and connecting with a main discharge pipe 22; so that any one of the single belts may be heated or cooled without affecting the temperature accessible in another or others of the belts of the set. The discontinuous passages forming wholly separate and distinct piping for the different belts are shown in Figure 6.

In the form shown in Figures 4 and 5 there are three general sources of fluid supply, at 15′, $15^2$ and $15^3$, each available for any of the inlets and cut-off from them by valves 14, but only one outlet for the three belts, necessitating the use of the lower belt, in connection with the second or middle belt and both the lower and middle belts in conjunction with the top belt, where fluid is applied. As it is desirable, almost invariably to heat the lower part of the contents, whether the upper part is being heated or not, the single outlet form is ordinarily not objectionable, and the additional outlets of Figure 3, are not ordinarily necessary.

The general sources of supply can be suited in number and character to the needs of the particular installation, with or without separate outlets.

When the kettle has been filled with the liquid to be treated, heating or cooling fluids can be supplied to any of the belts desired, together or with different temperatures in adjoining belts, giving great flexibility to the application of the heat-treating and cooling fluids.

Having thus described my invention, what I claim as new and desire to secure by Letters Patent is:

1. In a device for treating liquids, a kettle having integral side and bottom walls, fluid passages in the walls, and a plurality of points of inlet to and outlet from the said passages, in combination with controlled fluid supply for the inlets whereby fluid can be passed through the passages to surround one or more belts or zones of said kettle without passing through the other belt or belts thereof.

2. In a device for treating liquids, a kettle having spirally arranged piping in the solid walls thereof, surrounding several belts or zones of the kettle, in combination with separate inlets, one for the piping in each of said belts or zones passing through the walls of the kettle at different points for inlet to the different belts or zones, and outlet therefor, whereby different fluids can be applied at the same time in different belts or zones.

3. In a device for treating liquids, a kettle having solid walls and spirally arranged passage for fluid within the walls thereof, divided into belts having an inlet and outlet for the passage in each belt, the inlets respectively entering the walls of the kettle at different points for the different belts, in combination with fluid supply for said inlets.

4. In a device for treating liquids, a kettle having solid walls and spirally arranged passage for fluid within the walls thereof, divided into separate belts having an inlet and outlet for the passage in each belt, the inlets respectively entering the walls of the kettle at different points for the different belts, in combination with fluid supply for the same belt having different temperatures of supply.

5. In a device for treating liquids, a kettle having spirally arranged passage for fluid in the walls thereof, divided into separate belts having an outlet for the passage in each belt, in combination with separate inlets to the passages for the different belts and a plurality of temperatures of supply fluid for each of said inlets.

6. In a device for treating liquids, a kettle having spiral paths in its walls for fluid passage, divided into belts having inlets and outlets for the passages in the different belts, in combination with fluid supply at different temperatures for the inlets and valve means for cutting out any inlet from any or all supply.

JOHN GEORGE LEHMAN.